United States Patent [19]

Munn et al.

[11] Patent Number: 4,604,277
[45] Date of Patent: Aug. 5, 1986

[54] PRODUCTION OF AMMONIUM TETRATHIOTUNGSTATE

[75] Inventors: Robin W. Munn, Sayre; Kenneth T. Reilly, Towanda; Henry E. Hoffman, Towanda, all of Pa.

[73] Assignee: GTE Products Corporation, Stamford, Conn.

[21] Appl. No.: 766,222

[22] Filed: Aug. 16, 1985

[51] Int. Cl.$^4$ .............................................. C01G 39/00
[52] U.S. Cl. ..................................................... 423/517
[58] Field of Search ............................ 423/517, 58, 55

[56] References Cited

U.S. PATENT DOCUMENTS

| | | | |
|---|---|---|---|
| 2,556,255 | 6/1951 | Carosella | 423/58 |
| 2,892,741 | 6/1959 | Spengler et al. | 423/58 |
| 3,764,649 | 10/1973 | Kurtak et al. | 423/517 |
| 3,876,755 | 4/1975 | Kurtak et al. | 423/517 |
| 4,242,328 | 12/1980 | Hem et al. | 423/427 |
| 4,482,526 | 11/1984 | Ritsko et al. | 423/61 |

FOREIGN PATENT DOCUMENTS 41-6570   4/1966   Japan .................................... 423/58

Primary Examiner—John Doll
Assistant Examiner—Wayne A. Langel
Attorney, Agent, or Firm—Donald R. Castle; L. Rita Quatrini

[57] ABSTRACT

A process is disclosed for producing ammonium tetrathiotungstate. The process involves reacting an ammoniacal tungstate solution with hydrogen sulfide gas, the solution and the gas being in a closed system and the flow of the gas being regulated at an elevated pressure to form a slurry consisting essentially of a solid essentially all of which is ammonium tetrathiotungstate containing a portion of the starting tungsten and a mother liquor containing the balance of the tungsten. The slurry is then cooled to ambient temperature and the solid is removed from the major portion of the mother liquor. The solid is then washed with water and with alcohol followed by removal of the resulting respective water and alcohol washes to remove the remaining portion of the mother liquor and soluble impurities from the solid. The resulting washed solid is then dried at ambient temperature to form the final ammonium tetrathiotungstate.

7 Claims, No Drawings

PRODUCTION OF AMMONIUM TETRATHIOTUNGSTATE

This invention relates to a process for producing ammonium tetrathiotungstate. More particularly, it relates to a process for producing ammonium tetrathiotungstate which can be carried out economically on a commercial scale.

In the preparation of tungsten disulfide methanation catalysts, ammonium tetrathiotungstate can be used as the starting material.

Small quantities of ammonium tetrathiotungstate crystals such as 1 kg are generally prepared by bubbling hydrogen sulfide gas through an ammoniacal tungstate solution until saturated and allowing the solution to stand until a sufficient quantity of ammonium tetrathiotungstate crystallizes. For larger quantities of ammonium tetrathiotungstate this method is not commercially feasible because (1) the hydrogen sulfide is not efficiently utilized since much of the gas is not absorbed during the bubbling operation, (2) yields are poor, ranging from about 10% to about 30% by weight, based on $WO_3$ content of the starting solution, and (3) the method is extremely time consuming, especially the crystallization step.

Therefore, a process for producing ammonium tetrathiotungstate economically on a commercial scale would be highly desirable and an advancement in the art.

SUMMARY OF THE INVENTION

In accordance with one aspect of this invention, there is provided a process for producing ammonium tetrathiotungstate. The process involves reacting an ammoniacal tungstate solution with hydrogen sulfide gas, the solution and the gas being in a closed system and the flow of the gas being regulated at an elevated pressure to form a slurry consisting essentially of a solid essentially all of which is ammonium tetrathiotungstate containing a portion of the starting tungsten and a mother liquor containing the balance of the tungsten. The slurry is then cooled to ambient temperature and the solid is removed from the major portion of the mother liquor. The solid is then washed with water and with alcohol followed by removal of the resulting respective water and alcohol washes to remove the remaining portion of the mother liquor and soluble impurities from the solid. The resulting washed solid is then dried at ambient temperature to form the final ammonium tetrathiotungstate.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The starting source of tungstate in the process of this invention is an ammoniacal ammonium tungstate solution which is preferably prepared by mixing an ammonium tungstate solution with ammonium hydroxide having a concentration of from about 0.1N to about 15N, and preferably about 15N ammonium hydroxide to give a concentration of from about 5 to about 350 g $WO_3/l$, and preferably from about 50 to about 350 g $WO_3/l$. At concentrations less than about 5 g $WO_3/l$ essentially no ammonium tetrathiotungstate subsequently precipitates and at concentrations greater than about 350 g $WO_3/l$ not all of the ammonium tungstate remains solubilized.

The resulting ammoniacal tungstate solution is reacted with hydrogen sulfide gas, the flow of the gas being regulated at an elevated pressure of at least about 0.5 PSIG, and preferably at from about 5 to about 250 PSIG with about 5 PSIG being especially preferred, to form a slurry consisting essentially of a solid essentially all of which is ammonium tetrathiotungstate containing a portion of the starting tungsten and a mother liquor containing the balance of the tungsten. The length of time of the gassing procedure depends on the size of the reaction vessel, the amount of tungsten charged, and the actual pressure of the hydrogen sulfide gas.

The reaction is done in a closed system. Therefore, only the hydrogen sulfide which is absorbed and reacted will be drawn off the source of the gas, therefore no gas is wasted. A gas regulator on the hydrogen sulfide gas line maintains the pressure inside the sealed reaction tank at the desired pressure. As the hydrogen sulfide is used up the reaction to form the ammonium tetrathiotungstate, the pressure inside the tank is effectively decreased. This causes the hydrogen sulfide gas regulator to allow more gas into the tank until the pressure stabilizes at the desired pressure. As the hydrogen sulfide is reacted more is admitted to the reaction tank. Since the reaction to form the ammonium tetrathiotungstate is exothermic, the temperature will be elevated by about 20° C. to about 30° C. during the reaction. When the temperature begins to drop, it indicates that the reaction has reached completion. The contents of the reaction tank have therefore reached equilibrium and the flow of the hydrogen sulfide gas stops. The tank is then vented. The gassing can be continued at an elevated pressure for a period of time to aid in cooling and crystallizing the ammonium tetrathiotungstate.

The resulting slurry is then allowed to cool to ambient temperature.

The solid is then separated from the major portion of the mother liquor by any standard method with the preferred method being filtration.

The balance of the mother liquor which is entrained in the solid must be removed from the solid because the mother liquor decomposes, and if any mother liquor remains on the solid, a film of sulfur will be left on the solid. The solid is washed with water, preferably cold deionized water and then with alcohol, preferably ethyl alcohol to remove the balance of the mother liquor which is entrained in the solid and any soluble impurities from the solid. The washing steps are preferably done by pouring the washes, that is, the water and then the alcohol, on the solid which is preferably on a filter funnel and applying vacuum to remove the resulting respective wash solutions.

The resulting water wash can be added to the mother liquor to conserve tungsten and reaction materials such as ammonium hydroxide, and sulfide.

The alcohol wash can be reused until it is saturated with mother liquor after which the resulting saturated alcohol wash is processed to reclaim the alcohol for reuse in the washing step, and to form a tungsten containing residue which is processed to remove the tungsten.

The alcohol can be reclaimed by any method such as by standard commercial distillation. The tungsten can be recovered from the tungsten containing residue by any method known in the art.

The mother liquor which includes any reclaimed mother liquor and which consists essentially of ammonium hydroxide, ammonium tungstate, dissolved ammonium tetrathiotungstate, and ammonium sulfide can be recycled with additional ammonium hydroxide and ammonium tungstate, and reacted with hydrogen sulfide to form ammonium tetrathiotungstate.

The washed solid is dried at ambient temperature to form the final ammonium tetrathiotungstate. The drying is done preferably by either air or vacuum drying. Heat causes decomposition of the ammonium tetrathiotungstate.

Because of the gassing technique which is done in a closed system thus conserving hydrogen sulfide, recycling of the mother liquor, and reuse of the alcohol wash solution, and recycling of the water wash solution, the above process can be operated economically on a commercial scale.

To more fully illustrate this invention, the following non-limiting example is presented.

EXAMPLE

In a 20 gallon jacketed stainless steel tank, about 8.5 gallons of about 15N NH$_4$OH are mixed with about 4.5 gallons of ammonium tungstate solution containing about 2.2 pounds of WO$_3$ per gallon. The agitated tank is then sealed and pressurized to about 10 PSIG with hydrogen sulfide from a standard gas cylinder. After about 6 hours, the hydrogen sulfide gas flow is negligible and the temperature of the resulting slurry begins to decrease. The tank is vented slowly to reduce the pressure to ambient condition while the contents of the tank are cooled to less than about 20° C. The slurry is vacuum filtered to separate the ammonium tetrathiotungstate crystals from the mother liquor. The crystals are washed with about 0.5 gallons of cold (about 18° C.) deionized water. The mother liquor and wash are set aside for recycle to the next batch. About two 0.5 gallon denatured alcohol washes are then poured over the crystals and these washes are saved for further crystal batches. In order to dry the crystals, air is pulled through the crystal bed for about 90 minutes with occasional stirring. After processing, the crystals are placed in a sealed container. The yield is about 13.5 pounds of ammonium tetrathiotungstate which is about 91% of the starting WO$_3$.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing ammonium tetrathiotungstate comprising:
   (a) reacting an ammoniacal tungstate solution with hydrogen sulfide gas, said solution and said gas being in a closed system and the flow of said gas being at an elevated pressure to form a slurry consisting essentially of a solid, essentially all of which is ammonium tetrathiotungstate containing a portion of the starting tungsten, and a mother liquor containing the balance of the tungsten;
   (b) cooling said slurry to ambient temperature;
   (c) separating said solid from the major portion of said mother liquor;
   (d) washing said solid with water and with alcohol followed by removing the resulting respective water and alcohol washes to remove the remaining portion of said mother liquor and soluble impurities from said solid; and
   (e) drying the resulting washed solid at ambient temperature to form the final ammonium tetrathiotungstate.

2. A process according to claim 1 wherein said ammoniacal tungstate solution is contacted with said hydrogen sulfide gas at a pressure of from about 0.5 PSIG to about 250 PSIG.

3. A process according to claim 2 wherein the pressure is about 5 PSIG.

4. A process according to claim 1 comprising the additional step of adding the mother liquor to said ammoniacal tungstate solution prior to contacting said solution with said gas.

5. A process according to claim 4 wherein the resulting water wash is added to the mother liquor.

6. A process according to claim 4 wherein the alcohol is ethyl alcohol.

7. A process according to claim 4 wherein the resulting alcohol wash is reused in the washing step until the alcohol is saturated with mother liquor after which the resulting saturated alcohol wash is processed to reclaim the alcohol for reuse in the washing step, and to form a tungsten containing residue which is processed to remove the tungsten.

* * * * *